Patented Jan. 12, 1954

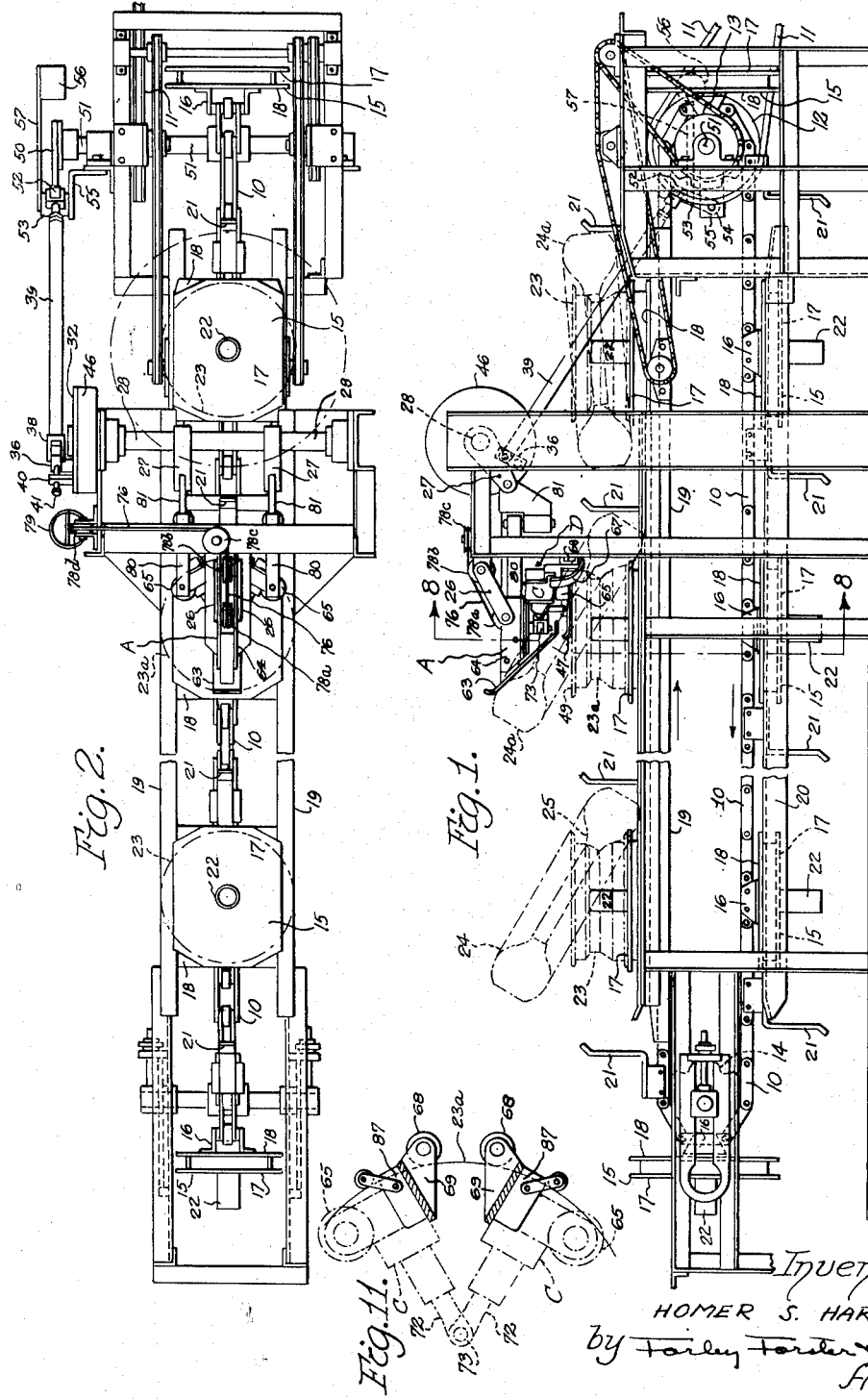

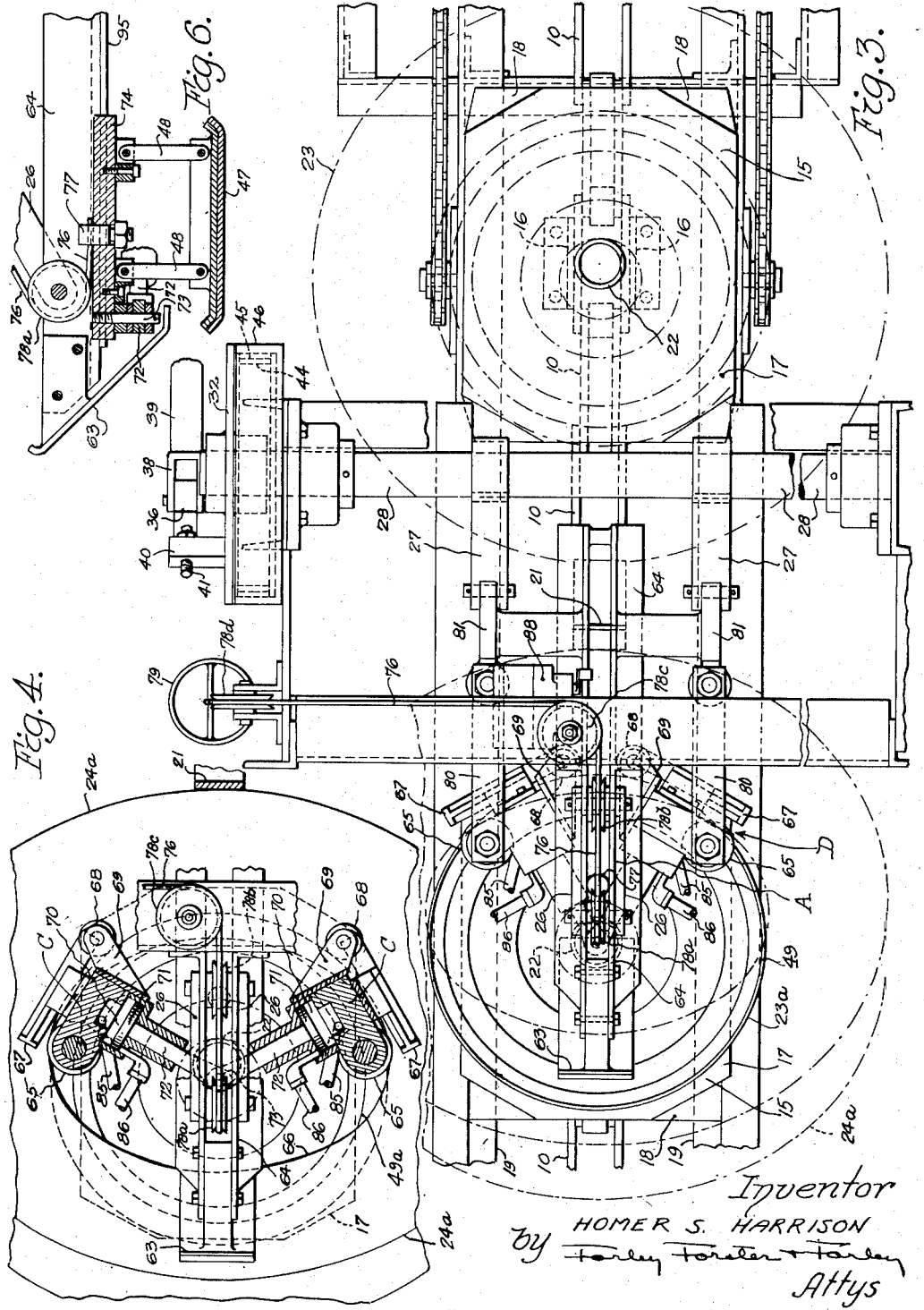

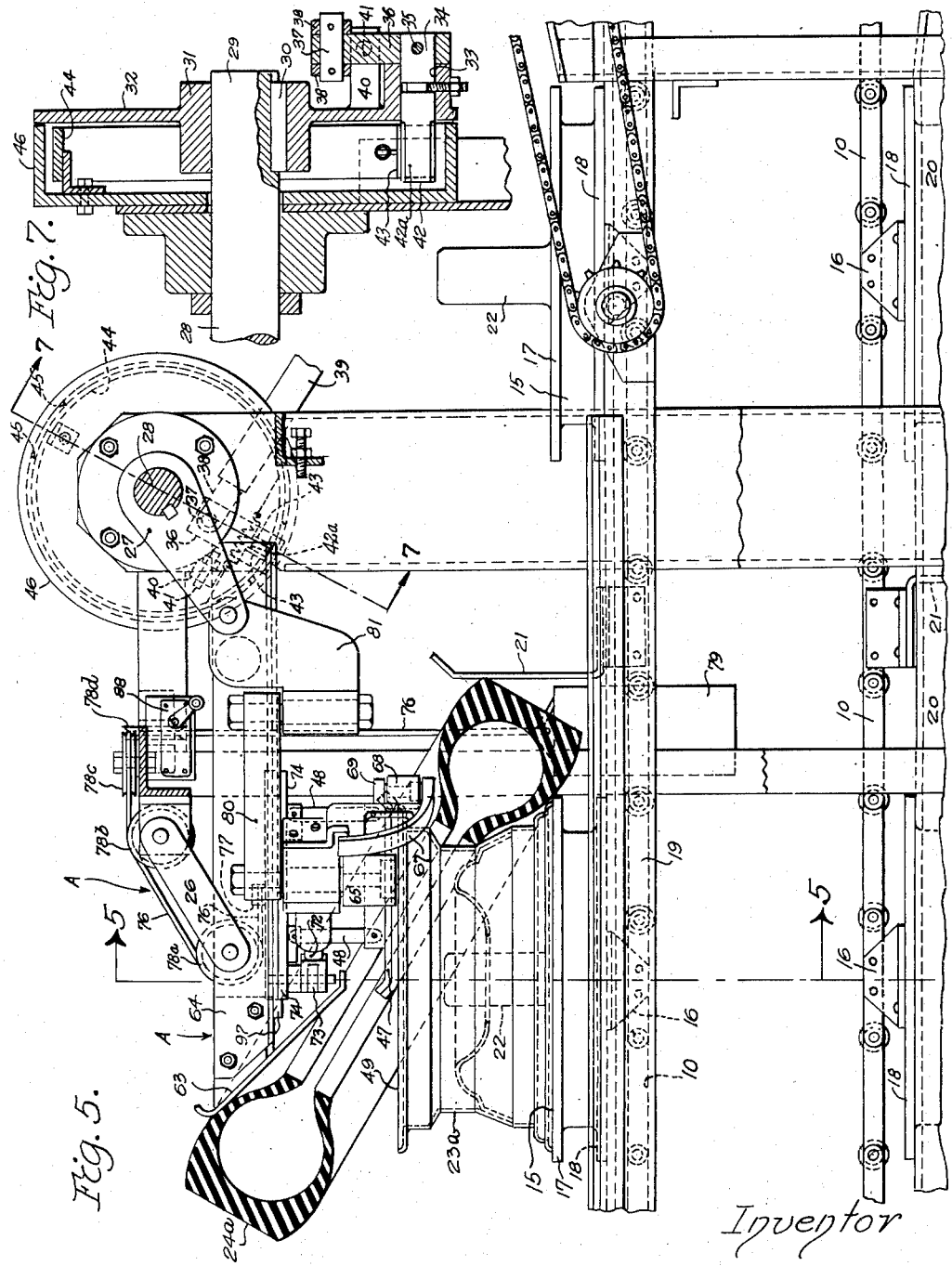

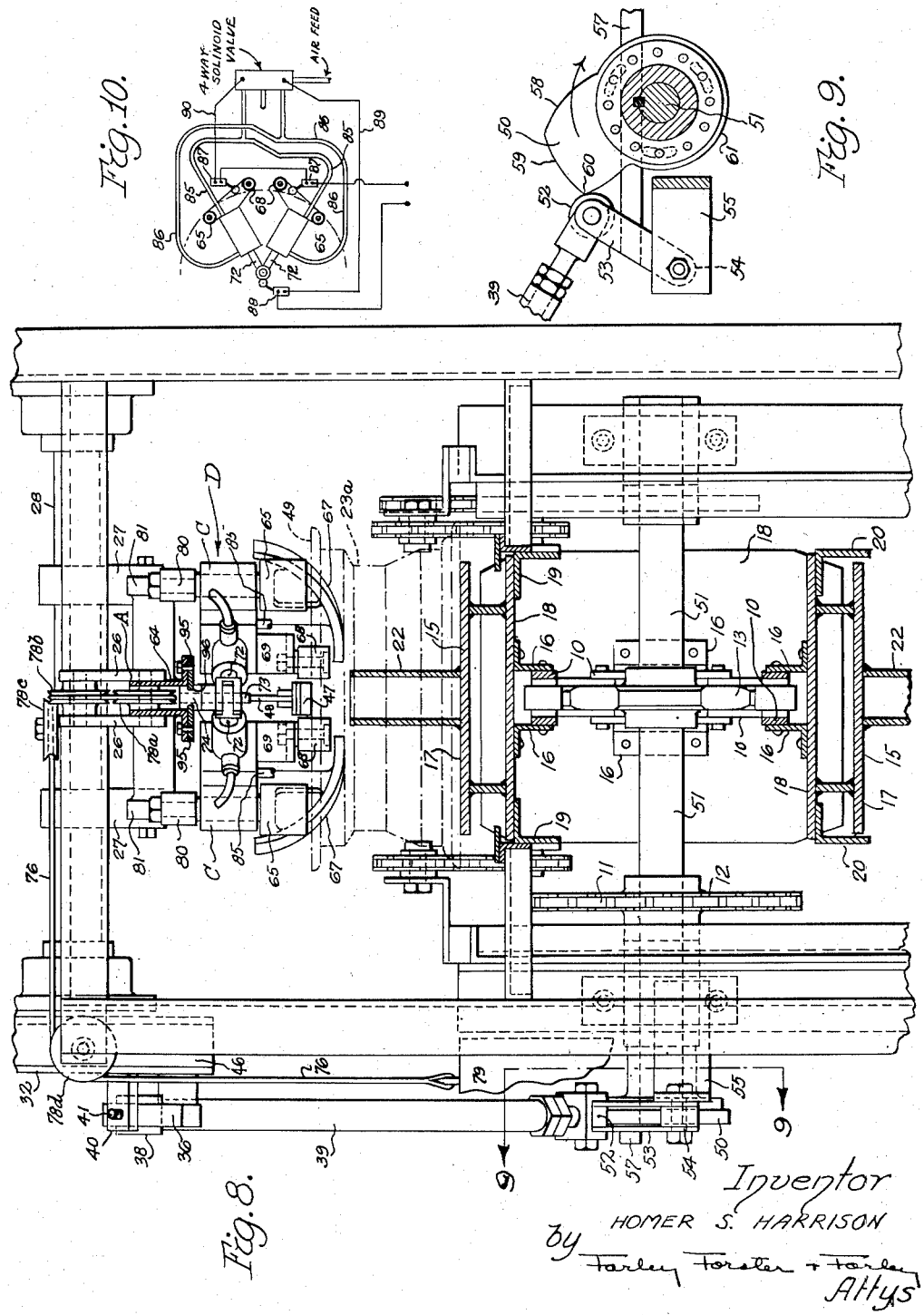

2,665,747

UNITED STATES PATENT OFFICE 2,665,747

AUTOMATICALLY ADJUSTABLE TIRE MOUNTING MACHINE AND CONVEYER

Homer S. Harrison, Detroit, Mich., assignor to Allied Steel and Conveyors, Inc., Detroit, Mich., a corporation of Michigan Application May 25, 1949, Serial No. 95,330

18 Claims. (Cl. 157—1.1)

This invention relates to a tire mounting machine and has for its principal object to incorporate automatic adjustments for size variations both in wheel width and diameter.

One type of mounting machine presently in use employs a conveyor which passes under a mounting head, wheels being carried flat on platens propelled by the conveyor. Tires are manually positioned on the wheels with the leading portion of a tire in place within the flanges of the rim, the innertube having been previously inserted in the casing, and the valve stem inserted through a hole in the rim also located at the leading portion of the wheel as positioned on the conveyor. As a wheel and tire passes under the mounting head, a mounting mechanism progressively moves around the edge of the wheel pushing the tire casing down into position. A fixed mounting head has been employed in machines of this type adapted for a single wheel thickness, and the mounting mechanism has been adapted to engage only wheels of a single diameter.

One object of the present invention is to employ a movable mounting head which will automatically position itself to the right height for any particular width of wheel passing through.

Another object is to provide a mounting mechanism automatically adjustable to different wheel diameters in a manner whereby a single machine may be adapted to mount tires of the proper sizes on the various standard sizes of wheels without any manual change in machine setup.

Another object is to provide vertical parallel movement for the mounting head with mechanical means for moving the head up after a tire has been mounted and back down when the next succeeding wheel and tire are in position under the head.

Another object is to provide gauge means registering directly on the rim of the wheel for limiting the downward travel of the mounting head.

Another object is to provide locking means for locking the mounting head at the proper height for any individual wheel width prior to the engagement of the mounting mechanism with the tire casing.

Another object is to provide gauge mechanism responsive to differences in the diameter of the wheel.

Another object is to make the latter gauge mechanism automatically condition the mounting mechanism for travel around the proper circumference in pressing the tire casing down into position.

These and other objects will be more apparent from an examination of the drawings forming a part hereof and from the detailed description of the particular embodiment shown by such drawings, wherein Fig. 1 is a side elevation of a tire mounting machine incorporating the aforementioned automatic adjustment features;

Fig. 2 is a plan view of such machine;

Fig. 3 is an enlarged fragmentary plan view of the central portion of said machine;

Fig. 4 is a fragmentary plan view of a portion of the structure of Fig. 3 showing the mounting mechanism at a subsequent stage to that shown in Fig. 3;

Fig. 5 is an enlarged side elevation of the central portion of the machine;

Fig. 6 is a fragmentary sectional view of the gauge mechanism which determines the vertical height of the mounting head shown in the position such mechanism occupies in Fig. 5;

Fig. 7 is a sectional view taken along the lines 7—7 of Fig. 5 of a brake mechanism employed in locking the mounting head;

Fig. 8 is an end elevation taken along the line 8—8 of Fig. 1;

Fig. 9 is a fragmentary view of the actuating cam taken along the line 9—9 of Fig. 8;

Fig. 10 is a schematic diagram showing the wiring and piping circuits for automatic control of the mounting mechanism; and Fig. 11 is a fragmentary plan view of a portion of the mounting mechanism showing the location of certain limit switches employed to control the operation thereof.

Referring to Figs. 1 and 2, it will be seen that the present tire mounting machine employs an endless conveyor chain 10 driven at one end of the machine by a motor, not shown, through a belt 11, pulley 12, and sprocket 13, such chain passing at the other end around an idler sprocket 14. At spaced intervals along the conveyor chain, flat platens 15 are connected to the links of the conveyor chain through angle brackets 16. Such platens have upper and lower plates 17 and 18, the lower plate 18 being supported by upper guide rails 19 during working travel of the platen and by lower guide rails 20 during return travel, the guide rails 19 and 20 being rigidly mounted by suitable means to the frame structure of the machine. Mounted on separate chain links in front of each platen is an angle bracket 21. A post 22 projects outwardly from the center of each platen and is adapted to extend through the substantially larger center opening of a wheel 23 when the latter is laid flat on the platen 15. After a wheel 23 is placed over a post 22, a tire 24 with tube inserted is placed on the wheel with its leading edge 25 (in the direction of conveyor travel) within the forward portion of the rim of the wheel, the bracket 21 serving to provide a positive limit for the position of the forward edge of the tire. As a wheel and tire pass beneath the mounting head, generally indicated at A, the tire casing is progressively pressed into the mounted position, shown in phantom at the delivery end of the machine, by mechanical means described hereinafter in detail.

The mounting head A is suspended from a fixed portion of the framework of the machine by two pairs of parallel arms 26 and 27, arms 26 being pivotally connected to the frame and mounting head, respectively, adjacent the longitudinal center line thereof, while arms 27 are pivotally connected at their lower ends to the mounting head and keyed to a cross shaft 28 at their other ends, the cross shaft 28 being journaled in the frame structure. Rotation of the cross shaft in a clockwise direction will cause the mounting head A to move up and backwards relative to the direction of the conveyor travel, while rotation in a counterclockwise direction will impart a downward and forward movement to the mounting head, the path being determined by the length and angular position of the equal parallel arms 26, 27.

As best shown in Fig. 7, one end 29 of the cross shaft 28 is keyed at 30 to the hub 31 of an annular disc 32. At the outer perimeter of the disc 32 a journal 33 is provided for a shaft 34 pinned at 35 to a crank arm 36, which arm is pivotally connected at 37 to a clevis 38 which is rigidly connected to an actuating link 39. An outwardly extending stop member 40, rigidly associated with the annular plate 32 is provided with a tapped hole for an adjustable screw stop 41 positioned to be contacted by the crank arm 36 limiting the counterclockwise rotation of such crank arm about the shaft 34. The shaft 34 is provided at its other end 42 with a pair of flats forming a narrow substantially rectangular section 42a (see Fig. 5) adapted to extend between actuating ends 43 of expandable brake shoe 44 on which a pair of brake bands 45 are mounted and are adapted to contact, upon expansion of the brake shoe 44, the inner surface of a brake drum 46 which is rigidly connected to the frame. When the shaft 34 is rotated away from a position where the narrow section 42a is parallel to the brake shoe actuating ends 43, the resulting expansion of the brake shoe 44 will set the brake bands 45 against the drum 46.

It will be seen from the description thus far that when the actuating link 39, as shown in Figs. 1 and 5, is moved upwardly and to the left the crank arm 36 will contact the stop screw 41 and continued movement of the link 39 will thereafter rotate the annular plate 32 and cross shaft 28 in a clockwise direction raising the mounting head A, while movement of the actuating link 39 in an opposite direction will permit the mounting head A to move to a lower position by gravity. The extent of such downward movement of the mounting head A is primarily governed by a gauge shoe 47, best shown in Figs. 5 and 6, which is suspended from the mounting head A by a pair of connecting bars 48 which have free pivotal connections at respective ends with the gauge shoe and mounting head.

It will be seen that, if the mounting head A is lowered when a wheel 23a is passing thereunder, the gauge shoe 47 will contact the upper edge of the rim 49 limiting the downward movement of the mounting head A. Continued movement of the actuating link 39 will thereupon cause the crank arm 36 to rotate shaft 34 in the journal 33 expanding the brake shoe 44 which will lock the cross shaft 28 against further rotation.

The actuation of the link 39 is synchronized with the travel of the conveyor chain by a cam 50 associated with the drive sprocket 13, as best shown in Figs. 1, 8 and 9. The drive sprocket 13 is designed to make one revolution while advancing the conveyor the distance between adjacent stations. Accordingly, the cam 50, which is keyed to one end of the drive shaft 51, makes one revolution for each tire mounted. A roller 52 journaled at the lower end of the actuating link 39 is adapted to follow the contour of the cam 50 with its path also determined by arms 53 pivotally connected at one end to the actuating link 39 at the axis of the roller 52 and at its other end 54 to a bracket 55 rigidly associated with the frame of the machine. A weight 56 (see Fig. 1) is rigidly connected by arm 57 to the arm 53 in a manner adapted to force the roller 52 into contact with the surface of the cam 50.

When the roller 52 rides up the rising edge 58 of the cam, the actuating link 39, as seen in Fig. 1, is moved upwardly and to the left, thereby raising the mounting head A to its uppermost position. This high position of the mounting head corresponds to its receiving position (for an unmounted tire and wheel) during which the gauge shoe 47 is above the upper edge 49 of the widest wheel accommodated by the machine. The time during which the mounting head A dwells at such high position is determined by the length of the high edge 59 on the cam 50 and will correspond to the time required for a wheel to move into position under the mounting head preparatory to the initiation of the tire mounting action. When the roller 52 passes over the corner 60 of the cam 50, the actuating link 39 is lowered to the position shown in the drawings where the gauge shoe 47 first contacts the rim 49. Continued rotation of the cam 50 results in a rapid downward movement of the actuating link 39 setting the brake band 45 as previously described. The low surface 61 of the cam 50 which occupies about three quarters of the cycle is substantially below the point corresponding to that at which the brake is set so that while the roller 52 is above such portion of the cam, the weight 56 acting through the arm 57 applies a predetermined load on the brake actuating mechanism. This arrangement will accommodate substantial wear on the brake lining 45 without loss of effective holding power.

The action thus far described covers the construction and operation of the machine up to the point where the mounting action per se begins to take place. After the brakes are set, the mounting head A remains in the fixed position determined by the width of the wheel 23a, as previously described, and the remaining operation of the machine involves the action of the mounting mechanism which is generally indicated at D and is suspended from the lower side of the mounting head A.

The tire mounting action takes place while the conveyor chain 10 and wheel 23a are in continuous motion under the mounting head A and consists essentially of three actuating forces. An angular skid 63, as best shown in Fig. 5, is rigidly connected to the horizontal framework 64 of the mounting head A and contacts the upper side wall of the tire 24a exerting a downward pressure on the rear portion of the tire as the wheel 23a moves progressively under the mounting head A. A second mounting force is exerted by a pair of rollers 65, the outer perimeter of which, as best shown in Figs. 3 and 4, lies just beyond the outer perimeter 49a of the wheel rim 49. These rollers engage the inner bead 66 of the tire casing on either side, and as the tire advances under the mounting head A, these rollers 65 are advanced around the perimeter of the rim 49 progressively forcing the bead 66 out over the edge of the rim 49 into a position where it may be pressed down into a mounted position. The third actuating force is that exerted by a pair of curved plows 67 which extend below the rim 49 and are adapted to engage the tire casing just outside of the inner bead 66 and just behind the point where such bead is pushed out over the edge of the rim 49 by the rollers 65, and thereby exert a downward pressure which progressively forces the casing to the inside of the rim 49.

Each of the rollers 65 and plows 67 are mounted in fixed relation to each other on one of a pair of movable mounting arms generally indicated at C. A second roller 68, vertically positioned to contact the outer edge of the rim 49, is also carried on each mounting arm C by means of brackets 69. A piston 71 in a cylindrical bore 70 in each of the mounting arms C has a piston rod 72 extending inwardly to a common pivotal connection 73 carried by a member 74 slidably mounted for longitudinal movement between a pair of opposed plates 95 which engage slots 96 in the body of the member 74. Plates 95 are attached to the frame members 64 of the mounting head. The member 74 is normally urged to a left or rearward position, as defined by a stop 97, by a cable 76 connected to such member by a clamp 77, which cable passes over a series of pulleys 78a, b, c, and d and extends down to a weight 79 on the side of the machine. The position of the mounting arms C is otherwise determined by a pair of longitudinal links 80 each pivoted at one end to the frame of the mounting head through bracket members 81 and at the other end to the arms C on an axis coinciding with that of a roller 65.

It will be seen that the pivotal connection 73 of the piston rods 72 and the pivotal connections of the links 80, together with the longitudinally slidable pivot 73, will permit the rollers 65 to swing outwardly away from each other as the pivot 73 slides forward.

It will also be seen that the rollers 68, bearing against the rim 49a of the wheel 23a as it advances under the mounting head A, will exert a forward and outward force on the mounting arms C which overcomes the resisting force of the weight 79, causing the member 74 and pivot 73 to advance with the center of the wheel and causing the mounting arms C to simultaneously move outward to define the path of movement of the rollers 65 and plows 67 around the perimeter of the wheel 23a. When initial contact is made between the wheel 23a and the rollers 68, the latter are in the position shown in Fig. 3, and reactive forces are exerted against the wheel which move it backward on the platen until the center of the wheel is in contact with the locating post 22 at the center of the platen. Thus, the wheel is automatically self-centered with respect to the mounting head A by the three-point contact with rollers 68 and post 22.

Continued movement of the wheel 23a forwardly will, as previously described, exert a spreading force on the rollers 68 and as such rollers spread, for example, to the position shown in Fig. 4, the effective spreading moment becomes progressively greater so that when high resistance is met by the rollers 65 in stretching the tire casing, the rollers 68 are at a position where a high mechanical advantage will be employed.

As the wheel 23a continues to move under the mounting head A, the rollers 68 will eventually reach a position in alignment with each other and the central pivot point 73, at which time the bead spreading rollers 65 and plows 67 will have moved part way around the rear half of the wheel. At about this time the remaining exposed bead of the tire casing on the outside of the rim 49 will, under the pressure of the plows 67, snap over the rim 49 completing the mounting action, and the rollers 68 will thereupon continue to follow around the rear edge of the wheel rim 49a to a position where they are back together, as shown in Fig. 3.

It will be seen that efficient action requires that the bead spreading rollers 65 extend just beyond the perimeter 49a of the rim 49 at all times throughout the cycle just described. Such positioning of the rollers 65 can be assured only if the distance between the central pivot 73 and the engaging surface of the guide rollers 68 is equal to the radius of the wheel rim. In order to accommodate two sizes of rim diameter, the effective radius of the arms C is made variable by the piston and cylinder construction, best shown in Fig. 4. A relatively larger radius is established by introducing the air pressure on top of the piston at 71 through fluid pressure lines 85, while a relatively shorter, effective radius results from moving the piston to the other limit of its travel with fluid pressure through lines 86.

An automatic control for either of two wheel diameters is established by a limit switch 87 carried by each of the mounting arms C, a limit switch 88 contacted by the upward movement of the mounting head A and a four-way electrically controlled valve. As schematically shown in Fig. 10, contact of the limit switch 88 establishes a circuit through line 89 moving the electrically controlled valve to a position where pressure through lines 86 will move the pistons 71 to their relatively small radius position. The limit switches 87 are positioned where they will be actuated simultaneously only by a large diameter wheel. Such a large diameter will be accommodated by its wheel, actuation of both of the limit switches 87, establishing a series circuit through line 90, thereby shifting the electrically controlled valve to a position where pressure will be introduced through lines 85 to expand the arms C to their maximum length.

From the above description, it will be seen that the objects of providing automatic adjustment for wheel width and diameter have been met with a construction both simple and reliable. However, numerous modifications in detail might be resorted to without departing from the scope of the invention as defined in the following claims.

I claim:

1. A tire mounting machine comprising a conveyor adapted to carry wheels having tires partially inserted between the rims of the wheel, and a mounting head in the path of said conveyor adapted to force the rest of the tire between the rims into mounted position as said wheel passes under said mounting head, characterized by said mounting head being movable, mechanism responsive to individual wheel width for determining the operating location of said mounting head relative to said conveyor in a manner adapted to accommodate wheels of different width, and mechanism for holding said mounting head at its proper location for any wheel width passing thereunder against tire mounting reaction forces.

2. A tire mounting machine comprising a conveyor adapted to carry wheels having tires partially inserted between the rims of the wheel, and a mounting head in the path of said conveyor adapted to force the rest of the tire between said rims into mounted position as said wheel passes under said mounting head, characterized by said mounting head being movable, mechanism for raising and lowering said mounting head relative to said conveyor in a manner adapted to accommodate wheels of different width, including gauging mechanism associated with said mounting head adapted to register against a wheel carried on said conveyor in order to establish the proper relative location of said mounting head for such wheel, and a locking mechanism adapted to hold said mounting head at such position with sufficient force to resist reaction forces exerted thereon by the tire mounting action.

3. A tire mounting machine comprising a conveyor adapted to carry wheels having tires partially inserted between the rims of the wheel, and a mounting head in the path of said conveyor adapted to force the rest of the tire between said rims into mounted position as said wheel passes under said mounting head, characterized by said mounting head being movable, mechanism for raising and lowering said mounting head relative to said conveyor in a manner adapted to accommodate wheels of different width, an automatic gauging mechanism associated with said mounting head adapted to register against a particular wheel passing thereunder in a manner establishing the proper relative position of said mounting head for said wheel, said gauging mechanism comprising a shoe depending from said mounting head and links connecting said shoe and mounting head for free swinging movement of said shoe.

4. A tire mounting machine comprising a conveyor adapted to carry wheels having tires partially inserted between the rims, and a mounting head in the path of said conveyor adapted to press the rest of the tire into mounted position as said wheel passes under said mounting head, characterized by said mounting head being movable relative to said conveyor in a manner adapted to accommodate wheels of different width, mechanism synchronized with the conveyor drive adapted to provide movement of said mounting head away from and toward said conveyor, gauging mechanism associated with said mounting head adapted to limit such motion toward said conveyor in accordance with the width of the particular wheel under said mounting head, and a locking mechanism adapted to hold said mounting head in the position established by said gauging mechanism during the mounting operation of said machine.

5. A tire mounting machine comprising a conveyor adapted to carry wheels having tires partially inserted within the rims, and a mounting head in the path of said conveyor adapted to press the rest of the tire into mounted position as said wheel passes under said mounting head, characterized by said mounting head being movable relative to said conveyor in a manner adapted to accommodate wheels of different width, mechanism synchronized with the conveyor drive adapted to provide movement of said mounting head away from and toward said conveyor, gauging mechanism associated with said mounting head adapted to limit such motion toward said conveyor in accordance with the width of the particular wheel under said mounting head, and a braking friction mechanism adapted to hold said mounting head in the position established by said gauging mechanism with sufficient force to withstand the reaction forces involved in the tire mounting operation.

6. A tire mounting machine comprising a conveyor adapted to carry wheels having tires partially positioned over the wheel, and a mounting head in the path of said conveyor adapted to press the rest of the tire into mounted position as said wheel passes under said mounting head, characterized by said mounting head being movable relative to said conveyor in a manner adapted to accommodate wheels of different width, mechanism including parallel arms pivotally connected at their respective ends to said mounting head and the framework of said machine, and reciprocating mechanism adapted to swing said mounting head in a path established by said parallel arms through a limited travel up and away from the direction of conveyor movement or down and toward the direction of conveyor movement.

7. A tire mounting machine comprising a conveyor adapted to carry wheels having tires partially positioned over the wheel and a mounting head in the path of said conveyor adapted to press the rest of the tire into mounted position as said wheel passes under said mounting head, characterized by said mounting head being movable relative to said conveyor in a manner adapted to accommodate wheels of different width, mechanism including parallel arms pivotally connected at their respective ends to said mounting head and the framework of said machine, and reciprocating mechanism adapted to swing said mounting head in a path established by said parallel arms through a limited travel up and away from the direction of conveyor movement or down and toward the direction of conveyor movement, said reciprocating movement being controlled by a cam which is synchronized with the conveyor drive.

8. A tire mounting machine comprising a conveyor adapted to carry wheels having tires partially positioned over the wheel, and a mounting head in the path of said conveyor adapted to press the rest of the tire into mounted position as said wheel passes under said mounting head, characterized by pivotal links connecting said mounting head to said machine framework, relative to said conveyor in a manner adapted to accommodate wheels of different width, mechanism including power means synchronized with conveyor travel, a reciprocating arm actuated by said power means adapted to move said mounting head away from said conveyor during the approach of a wheel to a position under said mounting head, to move said mounting head back toward the wheel on said conveyor, and gauge mechanism adapted to limit the return travel of said mounting head in accordance with the particular width of the wheel thereunder.

9. A tire mounting machine comprising a conveyor adapted to carry wheels having tires partially positioned over the wheel, and a mounting head in the path of said conveyor adapted to press the rest of the tire into mounted position as said wheel passes under said mounting head, characterized by means reciprocably connecting said mounting head to the framework of the machine, said mounting head being movable relative to said conveyor in a manner adapted to accommodate wheels of different width, mechanism including power means synchronized with conveyor travel, a reciprocating arm actuated by said power means adapted to move said mounting head away from said conveyor during the approach of a wheel to a position thereunder, gauge mechanism associated with said mounting head adapted to limit the return travel of said mounting head in accordance with the particular width of the wheel thereunder, and a brake mechanism adapted to hold said mounting head in the position established by said gauge mechanism during the tire mounting operation.

10. A tire mounting machine comprising a conveyor adapted to carry wheels having tires partially positioned over the wheel, and a mounting head in the path of said conveyor adapted to press the rest of the tire into mounted position as said wheel passes under said mounting head, characterized by means reciprocably connecting said mounting head to the framework of the machine, said mounting head being movable relative to said conveyor in a manner adapted to accommodate wheels of different width, mechanism including power driven cam means synchronized with conveyor travel, a reciprocating arm actuated by said cam means adapted to move said mounting head away from said conveyor during the approach of a wheel to a position thereunder, gauge mechanism associated with said mounting head adapted to limit the return travel of said mounting head in accordance with the particular width of the wheel thereunder, and a brake mechanism adapted to hold said mounting head in the position established by said gauge mechanism during the tire mounting operation, said reciprocating arm being adapted to move said mounting head through a portion of its stroke and to actuate said brake mechanism through another portion of its stroke.

11. A tire mounting machine comprising a conveyor adapted to carry wheels having tires partially positioned over the wheel and a mounting head in the path of said conveyor, said mounting head having a pair of arms pivotally connected to each other at their inner ends, means for connecting said arms to said mounting head to accommodate arcuate movement of their outer ends around the perimeter of a wheel passing under said mounting head, means synchronized with conveyor movement for causing said outer ends to follow said arcuate movement, members reacting against said arms and mounting head adapted to press the rest of the tire into mounted position as said wheel passes under said mounting head, said arms incorporating a variable-length construction adapted to mount tires on wheels of different diameters.

12. A tire mounting machine comprising a conveyor adapted to carry wheels having tires partially positioned over the wheel and a mounting head in the path of said conveyor, said mounting head having a pair of arms pivotally connected to each other at their inner ends, means for connecting said arms to said mounting head to accommodate arcuate movement of their outer ends around the perimeter of a wheel passing under said head, means synchronized with conveyor movement for causing said outer ends to follow said arcuate movement, members reacting against said arms and mounting head adapted to press the rest of the tire into mounted position as said wheel passes under said mounting head, said arms being characterized by variable-length construction adapted to mount tires on wheels of different diameters, a gauging mechanism for selectively determining the diametrical size of a wheel, and automatic mechanism responsive to said gauging mechanism for varying the length of said arms in accordance with said size.

13. A tire mounting machine comprising a conveyor adapted to carry wheels having tires partially positioned over the wheel and a mounting head in the path of said conveyor, said mounting head having a pair of arms pivotally connected to each other at their inner ends, means for connecting said arms to said mounting head to accommodate arcuate movement of their outer ends around the perimeter of a wheel passing under said head, a follower on each of said arms adapted to move around the rim through engagement with a wheel passing under said mounting head, members reacting against said arms and mounting head adapted to press the rest of the tire into mounted position as said wheel passes under said mounting head, said arms incorporating a variable-length construction adapted to mount tires on wheels of different diameters, a gauging mechanism on each of said arms spaced from said follower adapted to selectively register only on wheels of a particular diameter, and means responsive to said gauging mechanism for controlling the effective arm length.

14. A tire mounting machine comprising a conveyor adapted to carry wheels having tires partially positioned over the wheel and a mounting head in the path of said conveyor, said mounting head having a pair of arms pivotally connected to each other at their inner ends, means for connecting said arms to said mounting head to accommodate arcuate movement of their outer ends around the perimeter of a wheel passing under said head, a follower on each of said arms adapted to move around the rim through engagement with a wheel passing under said mounting head, members reacting against said arms and mounting head adapted to press the rest of the tire into mounted position as the wheel passes under said mounting head, said arms incorporating a variable-length construction adapted to mount tires on wheels of different diameters, a gauging mechanism on each of said arms spaced from said follower adapted to selectively register only on wheels of a particular diameter, fluid pressure actuated mechanism adapted to vary the effective length of said arms, and means responsive to said gauging mechanism for controlling said pressure actuated mechanism.

15. A tire mounting machine comprising a conveyor adapted to carry wheels having tires partially positioned over the wheel and a mounting head in the path of said conveyor, said mounting head having a pair of arms pivotally connected to each other at their inner ends, means for connecting said arms to said mounting head to accommodate arcuate movement of their outer ends around the perimeter of a wheel passing under said head, a follower on each of said arms adapted to move around the rim through engagement with a wheel passing under said mounting head, members reacting against said arms and mounting head to press the rest of the tire into mounted position as said wheel passes under said mounting head, said arms incorporating a variable-length construction adapted to mount tires on wheels of different diameters, a gauging mechanism on each of said arms spaced from said follower adapted to selectively register only on wheels of a particular diameter, fluid pressure actuated mechanism adapted to vary the effective length of said arms, a valve for controlling said fluid pressure actuated mechanism, and means responsive to said gauging mechanism for controlling said valve.

16. A tire mounting machine comprising a conveyor adapted to carry wheels having tires partially positioned over the wheel and a mounting head in the path of said conveyor, said mounting head having a pair of arms pivotally connected to each other at their inner ends, means for connecting said arms to said mounting head to accommodate arcuate movement of their outer ends around the perimeter of a wheel passing under said head, a follower on each of said arms adapted to move around the rim through engagement with a wheel passing under said mounting head, members reacting against said arms and mounting head to press the rest of the tire into mounted position as said wheel passes under said mounting head, said arms incorporating a variable-length construction adapted to mount tires on wheels of different diameters, a gauging mechanism on each of said arms spaced from said follower adapted to selectively register only on wheels of a particular diameter, fluid pressure actuated mechanism adapted to vary the effective length of said arms, and electrically operated valve means for controlling said fluid pressure actuated mechanism, said gauging mechanism including electrical contact limit switches adapted to control said valve means.

17. A tire mounting machine comprising a conveyor adapted to carry wheels having tires partially positioned over the wheel, a mounting head in the path of said conveyor, said mounting head having a pair of arms pivotally connected to each other at their inner ends, means for connecting said arms to said mounting head to accommodate arcuate movement of their outer ends around the perimeter of a wheel passing under said head, means synchronized with conveyor movement for causing said outer ends to follow said arcuate movement, members reacting against said arms adapted to press the rest of the tire into mounted position as said wheel passes under said mounting head, mechanism for raising and lowering said mounting head relative to said conveyor, and mechanism responsive to individual wheel width for determining the operating position of said mounting head in a manner adapted to accommodate wheels of different widths.

18. A tire mounting machine comprising a conveyor adapted to carry wheels having tires partially positioned over the wheel, a mounting head in the path of said conveyor, said mounting head having a pair of arms pivotally connected to each other at their inner ends, means for connecting said arms to said mounting head to accommodate arcuate movement of their outer ends around the perimiter of a wheel passing under said head, means synchronized with conveyor movement for causing said outer ends to follow said arcuate movement, members reacting against said arms adapted to press the rest of the tire into mounted position as said wheel passes under said mounting head, said arms incorporating a variable-length construction, and means responsive to individual wheel diameter for varying the effective length of said arms in a manner adapted to accommodate wheels of different diameter.

HOMER S. HARRISON.

References Cited in the file of this patent

UNITED STATES PATENTS

| Number | Name | Date |
|---|---|---|
| 595,548 | Rodgers | Dec. 14, 1897 |
| 1,442,519 | Breon | Jan. 16, 1923 |
| 1,451,344 | Robinett | Apr. 10, 1923 |
| 1,850,053 | Stevens | Mar. 15, 1932 |
| 2,492,321 | Roberts | Dec. 27, 1949 |

FOREIGN PATENTS

| Number | Country | Date |
|---|---|---|
| 12,282 | Great Britain | of 1888 |
| 492,250 | France | Mar. 11, 1919 |